Aug. 4, 1936.  F. J. FLINN  2,049,903
COMBINED HINGE PIN AND SUPPORTING HOOK
Filed April 24, 1935
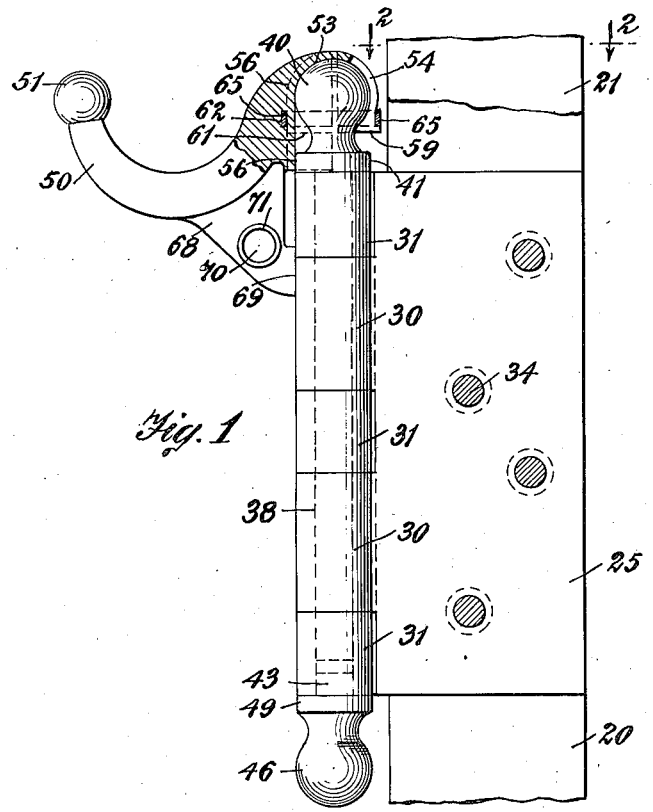
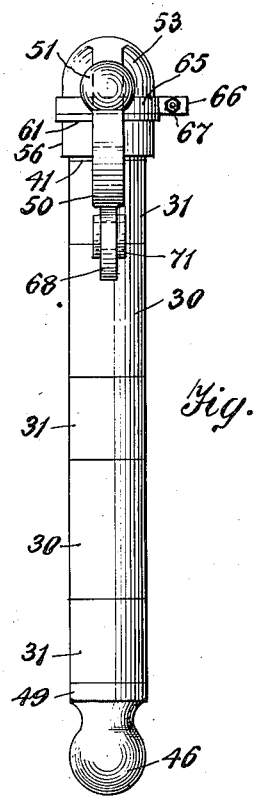
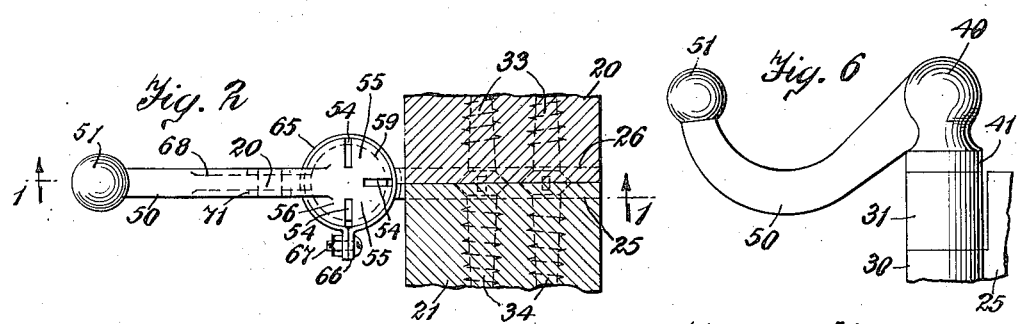
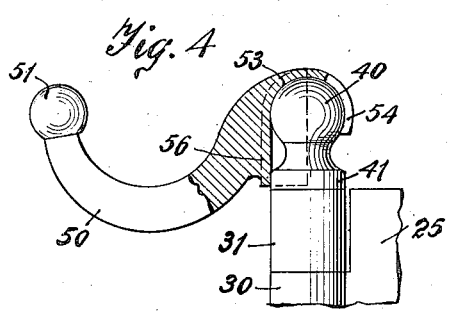
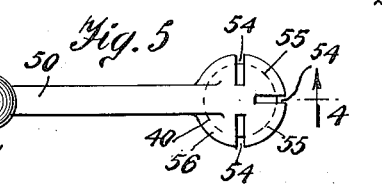
INVENTOR.
FRANCIS J. FLINN
BY
A. A. de Bonneville
ATTORNEY.

Patented Aug. 4, 1936

2,049,903

UNITED STATES PATENT OFFICE 2,049,903

COMBINED HINGE PIN AND SUPPORTING HOOK

Francis J. Flinn, Brooklyn, N. Y.

Application April 24, 1935, Serial No. 17,920

3 Claims. (Cl. 248—205)

This invention relates to a combined hinge pin and supporting hook.

The object of the invention is the production of a hinge pin which has extending therefrom a supporting hook for various articles.

The second object of the invention is the production of a supporting hook, which can be easily connected to the hinge pin of a hinge, while said pin is in operative position and without removing the hinge pin from the hinge.

In the accompanying drawing Fig. 1 represents a side view of the combined hinge pin and its supporting hook and a partial section about on the line 1.1 of Fig. 2; Fig. 2 shows a partial top view and section of Fig. 1 on the line 2.2; Fig. 3 is a partial left hand view of Fig. 1; Fig. 4 indicates a side view of a modification of the combined hinge pin and its supporting hook and a partial section as on the line 4.4 of Fig. 5; Fig. 5 represents a partial top view of Fig. 4 and Fig. 6 shows a side view of a further modification of the combined hinge pin and its supporting hook.

Referring to Figs. 1, 2 and 3 a vertical end portion of a door is indicated at 20 and the vertical coacting end portion of the frame for the door is shown at 21. The hinge for the door is indicated having the two leaves 25 and 26 with the intermeshing sleeves 30 and 31. The leaf 26 is fastened to the door 20 by the screws 33 and the leaf 25 is fastened to the frame 21 by the screws 34. The hinge pin 38 extends through the sleeves 30 and 31 and has integral with its top end the spherical shaped cap 40 having the collar 41 integral therewith and spaced therefrom. In the lower end of the lowermost sleeve 31 is indicated the shank 43 with the spherical shaped cap 46 having the collar 49 integral therewith.

A supporting hook 50 has integral therewith at its outer end the spherical shaped end 51 and at its other end is indicated the spherical shaped hood 53 having the longitudinal slots 54, which divide the hood 53 into the flexible clamping members 55 and the member 56. The flexible clamping members 55 when in operative position extend below the center of the cap and at their lower ends have extending from their outer faces the supporting flanges 59. A supporting flange 61 extends from the outer face of the clamping member 56 and is in line with the flanges 59. The lower end of the member 56 when in operative position bears against the collar 41. An opening 62 extends through the hook 50 just above the flange 61. Through said opening 62 extends the clamping ring 65 which at its open ends has extending therefrom the end flanges 66. The latter are clamped to each other by the bolt 67. The ring 65 is supported upon the supporting flanges 59 and 61.

Integral with and extending below the hook 50 is indicated the rib 68 having the heel 69 and the latter bears against a pair of the sleeves 30 and 31. In the rib 68 is indicated the opening 70 and the projections 71 extend from the rib 68 for said opening 70.

The hook 50 functions as the main element for supporting various articles and the opening 70 is provided as a supplementary means for supporting additional articles.

It will be noted that the hook 50 can be placed in operative position upon the cap 40 without detaching the hinge pin 38 from the sleeves 30 and 31. This is accomplished by disengaging the bolt 67 from the flanges 66 and forcing the hood 53 in place upon the cap 40. Next the flanges 66 are connected by the bolt 67.

Referring to Figs. 4 and 5 the hinge is again indicated with its leaf 25 and the sleeves 30 and 31. The cap of the hinge pin is again shown at 40. The supporting hook is again indicated at 50 with its spherical end 51, and the spherical shaped hood 53 having the longitudinal slots 54 for the clamping members 55 and 56. The members 55 when in operative position extend below the center of the cap 40, and the lower end of the member 56 bears aganst the collar 41. In this modification the rib 68 with its heel 69 is omitted and the hood 53 is maintained in operative position upon the cap 40, by the tension of the members 55 against the cap 40 and the lower portion of the member 56 bearing against the collar 41 of said cap 40.

Referring to Fig. 6, one of the leaves of the hinge is indicated at 25 with its sleeve 30 and one of the other sleeves of the hinge is shown at 31. The cap of the hinge bolt is again shown at 40 with its collar 41. The hook is again indicated at 50 with its spherical end 51. The hook 50 is shown extending from and integral with the cap 40 of the hinge pin.

Various modifications may be made in the invention and the present exemplification is to be taken as illustrative and not limitative thereof.

Having described my invention I claim:

1. The combination of a supporting hook and a hinge pin, a spherical shaped cap integral with the hinge pin, a collar integral with said cap and spaced therefrom, a spherical shaped hood at one end of the hook, said hood comprising a plurality of clamping members spaced from each other, one of said members having its lower end bearing against the collar of the cap and the lower ends of the other clamping members extending below a plane at right angles to the longitudinal axis of the hinge pin and below the center of its spherical cap and a detachable clamping ring bearing against the clamping members of the hood to clamp them to the spherical shaped cap of the hinge pin.

2. The combination of a supporting hook and a hinge pin, a spherical shaped cap integral with the pin and spaced therefrom, a spherical shaped hood at one end of the hook, said hood comprising a plurality of clamping members spaced from each other, one of said members having its lower end bearing against the collar of the cap, the other members being flexible and their lower ends extending below a plane at right angles to the longitudinal axis of the hinge pin and below the center of the spherical cap, supporting flanges extending from the outer faces of the members of the hood, a clamping ring having open ends extending through an opening of the supporting hook and bearing on said flanges and means to fasten the open ends of the clamping ring to each other to clamp the members of the hood to the cap of the hinge pin.

3. The combination of a supporting hook and a hinge having intermeshing sleeves, a hinge pin engaging said sleeves, a spherical shaped cap integral with the hinge pin, a collar integral with the cap and spaced therefrom, a spherical shaped hood at one end of the hook, said hood comprising a plurality of clamping members spaced from each other, one of said members having its lower end bearing against the collar of the cap, the other members being flexible and their lower ends extending below the center of the spherical cap, means to clamp the clamping members to said spherical shaped cap, a rib having an opening extending from the supporting hook and a heel integral with said rib bearing against the intermeshing sleeves of the hinge.

FRANCIS J. FLINN.